United States Patent [19]

Jones et al.

[11] 4,337,045

[45] Jun. 29, 1982

[54] NAVIGATION TRAINING AIDS

[75] Inventors: Frank Jones, Finchampstead; Peter Tomlinson, Burleigh, both of England

[73] Assignee: Jones and Healy Marine Limited, Wokingham, England

[21] Appl. No.: 180,107

[22] Filed: Aug. 21, 1980

[51] Int. Cl.³ ............................................. G09B 9/06
[52] U.S. Cl. ................................................... 434/29
[58] Field of Search .................. 434/29, 30, 239, 240, 434/241, 242, 243, 244

[56] References Cited

U.S. PATENT DOCUMENTS

| | | | |
|---|---|---|---|
| 2,321,799 | 6/1943 | Cone, Jr. et al. | 434/243 |
| 2,855,701 | 10/1958 | Roos | 434/29 |
| 3,584,397 | 6/1971 | Woodcock | 434/29 |
| 3,845,571 | 11/1974 | Hervieu | 434/29 |
| 3,871,113 | 3/1975 | Crago et al. | 434/29 |
| 4,026,038 | 5/1977 | Sunter et al. | 434/29 |
| 4,281,994 | 8/1981 | Dell et al. | 434/30 X |

*Primary Examiner*—William H. Grieb
*Attorney, Agent, or Firm*—Cushman, Darby & Cushman

[57] ABSTRACT

A ship navigation and handling training simulator comprises a console for use by an instructor and a console for use by a student navigator. Each console has a visual display unit with a screen to provide a mimic display of the ship and environmental information, and the instructor console is associated with two groups of controls for setting in, respectively, the environmental and display information applicable to the navigational or ship handling exercise to be performed and information representing ship/tug control decisions by the student. The consoles are interconnected by a voice link so that the instructor can initially set the environmental and display controls and subsequently adjust the group of controls for ship/tug control in accordance with vocal instructions from the student transmitted via the voice link. Computer means are programmed to control the displays on the screens on a time scale in accordance with the information set-in on both groups of controls and the changes thereto during the course of the exercise.

12 Claims, 8 Drawing Figures

NAVIGATION TRAINING AIDS

BACKGROUND OF THE INVENTION

This invention relates to navigation training aids, and in particular to navigation training simulators of the type which provide a navigator undergoing training with a graphic display presenting a bird's-eye view which simulates his own vessel and environmental data. It is of particular, although not exclusive, application to such a simulator primarily useful to train a pilot in respect of the berthing of large tankers and ore carriers.

With the advent of very large cargo carriers, for example supertankers, it has become increasingly difficult for the pilot to judge speed of approach, angle and distance-off of his ship with respect to the jetty during a berthing operation. With the bridge at the stern of a ship and at a considerable height above the waterline the pilot's view of the jetty opposite the bow and its relationship with the stern position, complicated by other extraneous inputs to the berthing manoeuvre, make it difficult to judge a safe speed of approach and distance. Any mistake in velocity of impact with the jetty can result in costly damage to the ship and/or jetty, commonly to both.

Over the last few years there has been considerable development in the field of berthing aids, including sonar ranging and the provision of jetty displays of parameters such as distance-off and approach velocities. However, progress in the field of training aids has not kept pace and there is the need for a satisfactory training aid which can be used to simulate the berthing of a large cargo carrier. The principal object of the invention is accordingly to provide such a simulator which is reasonably priced, easily installed, of considerable versatility and which, in particular, will enable pilots to get the "feel" of the berthing problem in non-operational conditions.

SUMMARY OF THE INVENTION

According to the invention a ship navigation training simulator comprises a console with a screen to provide a mimic display of the ship and environmental information, two groups of controls for setting-in respectively the environmental and display information applicable to a navigational excercise to be performed and information representing ship/tug control decisions by the trainee for example engine speed and rudder angle, and computer means programmed to control the display on a time scale in accordance with the information set-in on both groups of controls and changes thereto during the course of the exercise.

The simulator can be utilised in a self-teach programme, or the environmental conditions and display data may be initially set by an instructor when the separate grouping of the ship/tug controls and the environmental and display controls facilitate separation of the instructor/student functions and the latter is required to manipulate a minimum number of controls during a berthing exercise, for example. However, it is preferred that a separate console be provided for use by the student, and as in a 'real life' situation a berthing operation is controlled by the pilot via vocal instructions (to tugs, berth, etc.) there are preferably no manually set controls accessible to the student, the two consoles being interconnected by a voice link. With this arrangement, in which the two consoles may have identical displays, the instructor not only first sets the environmental and display controls but also subsequently adjusts the ship/tug controls according to the vocal instructions received from the student. This is a fundamentally novel concept in the field of berthing training aids.

Preferably the tug controls are provided on separable modules, conveniently five in number, so that other students may assume the roles of tugs masters each of whom is in vocal communication with the student console. Three communication devices for use by the student preferably respectively simulate an internal telephone (to main control positions), a VHF telephone (to tug and berthing masters) and a talkback system (to the bridge). In a preferred embodiment only one communication device is provided for the instructor, the equipment detecting and indicating which device is in use by the student and automatically connecting it to the instructor's communication device.

Controls are desirably provided to select the scale at which the exercise is presented on the display and a cursor device may be adjustable relative to the display screen for positioning of the display thereon. At the relevant time during berthing definition the computer may control the position of the centre of the ship on the screen so that it coincides with the cursor, thus allowing any initial ship position to be obtained relative to the remainder of the display. An origin pseudo randomisation technique may be employed in order to prolong the life of cathode ray tubes on which the displays are presented, every time the equipment is switched on or the display scale is changed an origin being automatically selected which can randomly vary in position within a predetermined area of the screen, for example a 1 cm square area.

Desirably a facility for recording the vocal communications between student and instructor is provided and a line printer, graph plotter or similar may provide a hard copy record. Preferably recording means enable an exercise to be recorded for subsequent replay, and said time scale is preferably variable in respect of both an exercise and the replay thereof. Conveniently an exercise can be performed at speeds from real time to a multiple of real time, thereby compressing the exercise into a fraction of the actual time of the berthing operation which is simulated.

Other features of the invention will be apparent from the following description, drawings and claims, the scope of the invention not being limited to the drawings themselves as the drawings are only for the purpose of illustrating a way in which the principles of the invention can be applied.

DESCRIPTION OF THE PREFERRED EMBODIMENT

Figure 1:
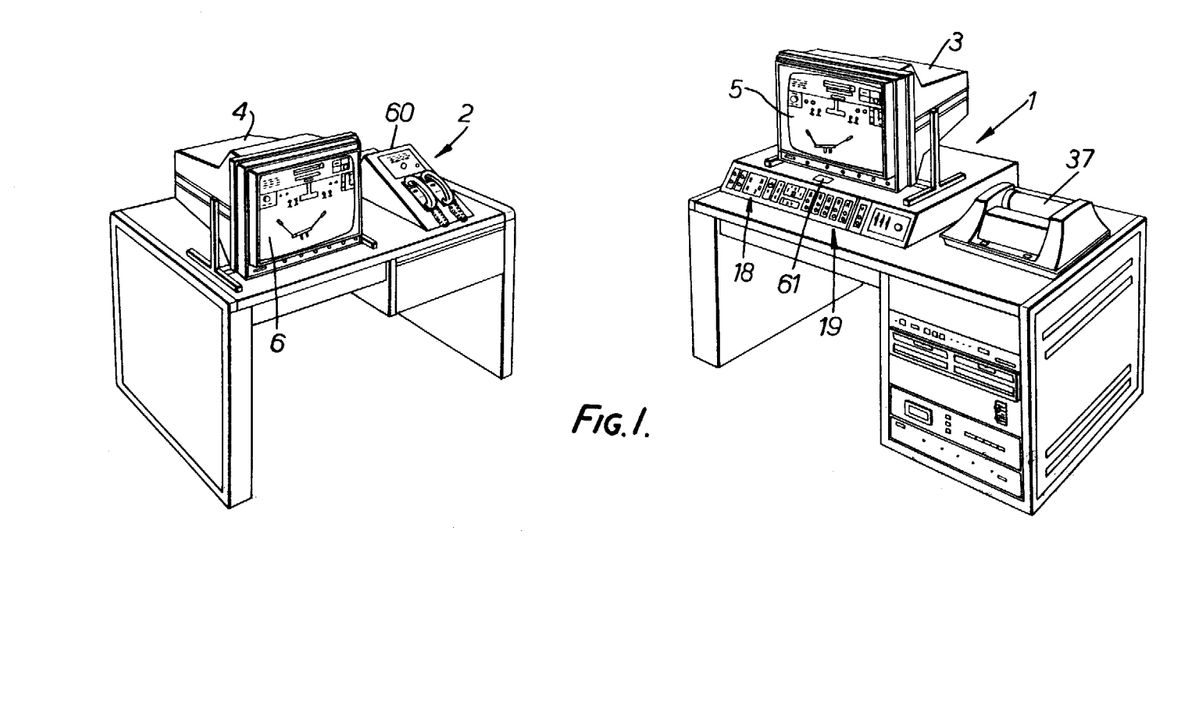
FIG. 1 is an artistic impression of the equipment which comprises separate instructor and student consoles.

The equipment comprises an instructor console 1 and a separate student console 2 each of which has a visual display unit (VDU) 3 or 4 presenting on the screen of a cathode ray tube 5 or 6 a mimic display simulating a navigational exercise chosen by the instructor. Both screens show an identical display, but certain instrument readings and computer generated messages may optionally be restricted to the instructor's display. A typical berthing exercise is illustrated and shown in greater detail in FIG. 4. Referring to that figure, this display shows a bird's eye view including outlines of the ship S, the jetty J, fenders F1,F2,F3,F4 and tugs T1,T2,T3,T4. The playing area is switchable in stages, for example from two miles (approach phase) to two ship lengths (berthing phase).

Figure 4:
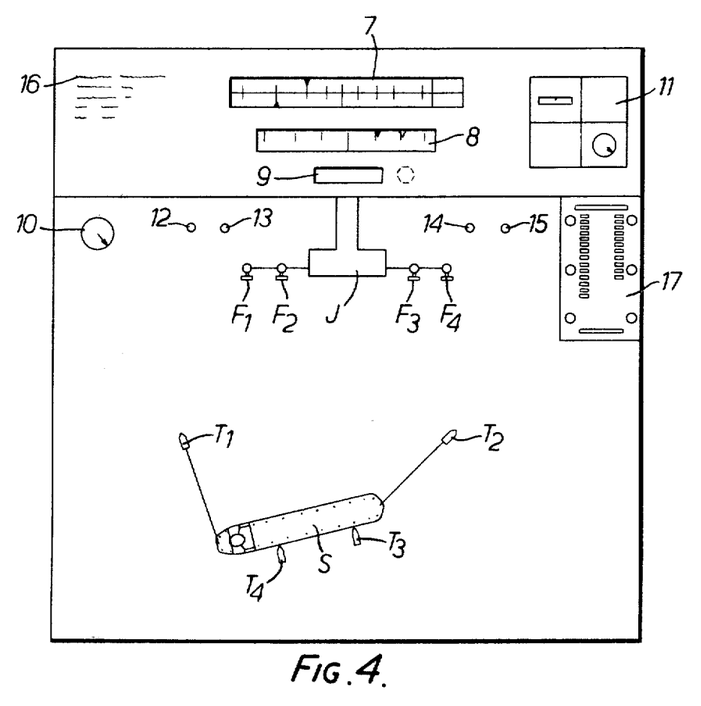
FIG. 4 shows a typical console display during a berthing exercise.

Appropriate information relating to the berthing exercise is continuously displayed. Thus, Engine Order/Engine RPM is displayed at 7, Rudder Order/Rudder Angle is displayed at 8, the Compass Heading at 9, and Wind Direction and Speed at 10. Additional information which can be individually selected to appear on the instructor's display only, on both displays, or on neither display comprises Rate of Turn Indicator, Bow Thruster RPM and Speed Log at 11, Fairlead/Bollard Indentification at 12 to 15 and exercise description (type of vessel and berth, number of tugs, etc.) at 16. If required a berthing aid display can be presented at 17, the drawings illustrating the well-known IDASAT display, alternative displays such as those used with Doppler radar or Doppler sonar (ship borne) also being selectable. In order to prolong the life of the cathode ray tubes a pseudo randomisation technique is employed. Every time the system is switched on or the display scale changed an origin is automatically selected, randomly positioned anywhere within a 1 cm square area of the screen. This ensures that the static display components, for example the instrument data, are not always drawn in the same position on the screens 5 and 6.

The instructor console 1 has two groups of controls 18 and 19 for setting-in respectively environmental and display information and information representing ship/tug control decisions by the student navigator. These controls are grouped on separate control panels mounted side-by-side as shown in FIG. 1 and they are illustrated in detail to a larger scale in FIG. 5. The nature and function of the controls will now be described with particular reference to FIG. 5 and starting with the environmental controls 18. Berthing definition controls which are used only at the start of an exercise comprise a multi-position switch (MPS) 20 which selects the type of vessel concerned, for example a 250,000 dwt tanker loaded, a 250,000 dwt tanker ballasted or a 60,000 dwt twin-screw container ship. A MPS 21 selects the type of berth, for example an open-sea berth with four fenders as in the illustrated display, a knob 22 controls the heading of the ship S and MPSs 23 set the keel clearance in meters. The knob 22 is used in conjunction with a joystick cursor control 24 to define fully the initial ship position. When switched on by a switch 25 the control 24 moves a cursor, in the form of the symbol "+". At the relevant time during berthing definition the centre of the ship S is automatically controlled to coincide with the cursor to enable any initial ship position to be achieved.

Figure 5:
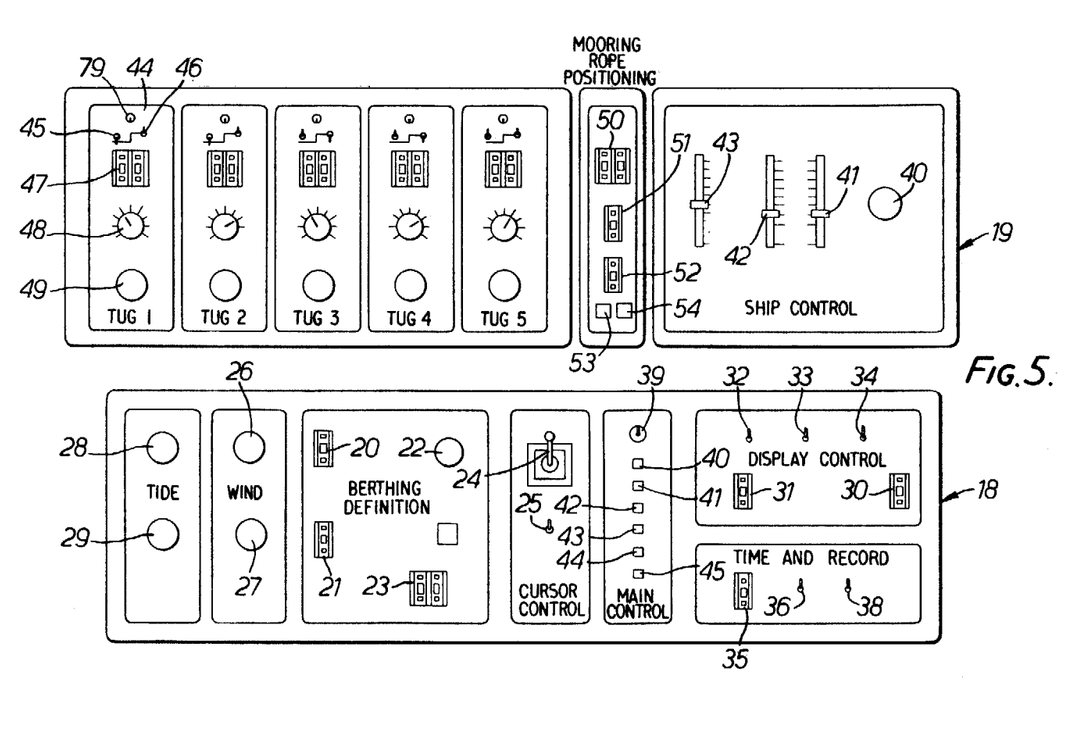
FIG. 5 illustrates control panels of the instructor console.

Two controls 26 and 27 respectively set Wind Direction and Speed, and controls 28 and 29 respectively set the Tide Direction and Speed. The wind and tide controls can be altered at any time during an exercise except that if a solid berth is selected by the control 21 the Tide Direction control 28 is automatically rendered inoperative and the tide assumed to be parallel to the berth.

The display controls of the group 18 are five in number and they select the scale of the display and which of the optional instrument/identifiers are to be presented. A Display Expansion control provided by a MPS 30 selects the required playing area and a MPS 31 selects which (if any) berthing aid is to be displayed at 17 but whatever the position of this switch a selected aid will only be displayed if maximum expansion (berthing phase) is selected by the switch 30. A three-position switch 32 selects whether the optional instrument readings (Rate of Turn Indicator, Bow Thrust RPM, Speed Log etc.) are to be displayed at 11 in the instructor display only, both student and instructor displays, or neither display. Another three-position switch 33 selects whether the numbering of the tugs is to be displayed on the instructor display, both displays, or neither display, and a further three-position switch 34 selects whether the numbering of the Ship Fairlead and Jetty Bollard Positioning is to be displayed on the instructor display, both displays, or neither display.

Time and record controls are used to select which time scaling and recording devices are to be employed, and they are three in number. An MPS 35 selects the speed at which the exercise is to be carried out (1, 2, 3, ... ,n times real time), a switch 36 is used to set a hard copy device 37 in FIG. 1 ON or OFF, and a switch 38 determines whether an exercise is to be recorded for subsequent replay. A main control section of the group 18 controls the operational mode of the equipment and includes a main ON/OFF switch 39 and six illuminated pushbutton switches 40 to 45. An Enter switch 40 is pressed to signal that the operator has completed a particular setting-up task, a Run switch 41 signals that an exercise should commence, a Halt switch 42 is used to indicate that an exercise should be suspended, a Continue switch 43 that a suspended exercise should be resumed, a Replay switch 44 to signal that a recorded exercise should be replayed, and a Test switch 45 to institute an automatic self-test routine (i.e. to check for hardware failures).

The ship/tug control group 19 has the controls thereof arranged in three sections relating respectively to ship control, tug control and mooring rope position. The first section comprises a control 40 for Rudder Angle; a slider control 41 for the Starboard Engine, this control being inoperative if the instructor has selected a single-screw ship for the exercise; a similar slider control 42 for the Port Engine, or main engine control of a single-screw ship; and a Bow Thruster control 43, again in the form of a slider. In order to give a more realistic response artificial time lags are introduced whenever any change is made to the ship controls.

The tug control section comprises five identical modules such as 44 each to simulate the control of one tug and thus allowing up to five tugs to be used in an exercise. Each module 44 is removable from the console 1 to enable fellow students to assume the roles of tugs masters, and it incorporates five controls. The first control is a manual/automatic switch 79 which is used to select the mode of operation for controls 45, 46, 47 and 49 so that when "manual" is selected the operator has complete control of the tug whereas in the "automatic" mode part of the burden of controlling the tug (e.g. manoeuvring from pulling at one position to pushing at another) is removed from the operator and performed automatically by the computer. A switch 45 (operative only in automatic mode) is set according to whether the tug is to push or pull the ship and if 'pull' is selected then a tow rope is automatically connected in the display. A Rope On/Rope Off switch 46 is used to connect or disconnect a tug rope in manual mode or simulate a tug rope failure in automatic mode and MPSs 47 are used to select which of the twenty-one available connection points to the ship S is to be used, the switch position '00' being selected when the tug concerned is not in use. A control 48 is used to set tug Engine Speed in increments of 50 RPM from zero up to 500 RPM, and the fifth tug control 49 sets the Relative Heading in automatic mode (i.e. the direction of the tug relative to the ship S.) or the absolute Heading in manual mode. In order to give a more realistic response time lags are automatically introduced in respect of changes in the tug controls, other than the Rope On/Rope Off control simulating rope failure.

The final section of the control group 19 comprises Fairlead MPSs 50 which enable any one of the available connection points on the ship to be chosen, a Bollard MPS 51 which allows any one of the connection points to the jetty J to be chosen, and a Force MPS 52 which is set to the required 'winch-in' force. This section of the controls is completed by a Connect button 53 and a Detach button 54. To simulate the connection of a mooring rope the MPSs 50, 51 and 52 are set and the button 53 is pressed; to simulate disconnection, the MPSs 50 and 51 are set and the button 52 is pressed.

Figure 2:
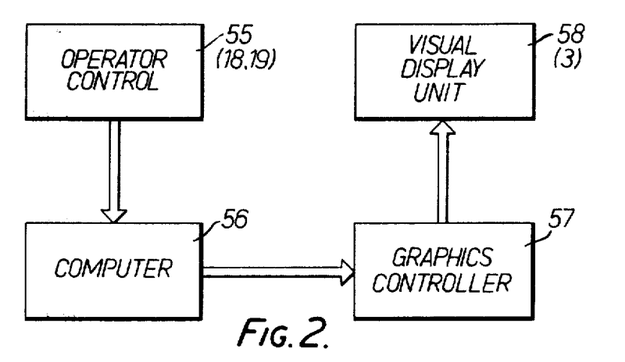
FIG. 2 is a basic system block diagram.
Figure 3:
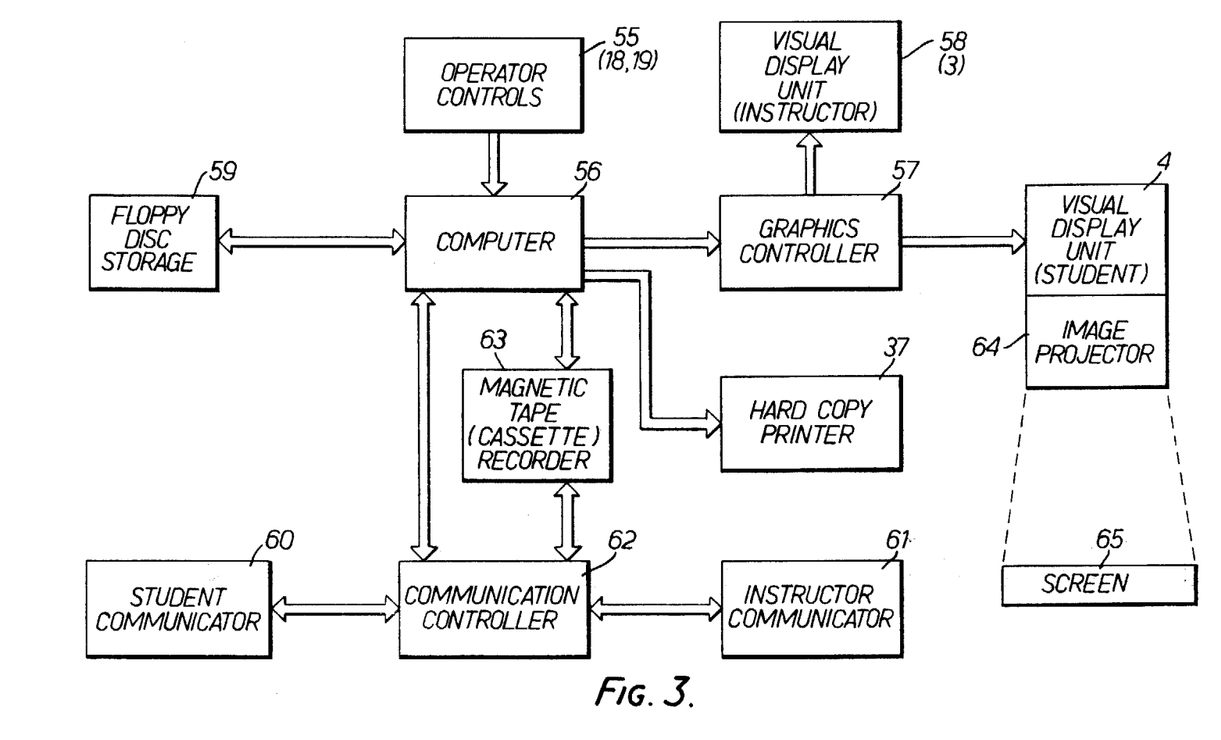
FIG. 3 is a full system block diagram.

The basic simulator system as shown in FIG. 2 comprises operator controls 55, such as those 18,19 which have been described, the main computer 56, a graphics controller 57 and a single VDU such as the unit 3. Various optional elaborations of this basic system are possible, up to the full system utilised in the embodiment illustrated in FIG. 1 and the block diagram of which is shown in FIG. 3. This illustrates, in addition to the basic system elements 55 to 58, the additional student VDU 4, bulk storage device 59 (e.g. hard disc, floppy disc, magnetic tape, semiconductor memory, core memory, bubble memory, punched tape, punched cards, etc.) the 'hard copy' line printer 37, which may alternatively be a graph plotter, chart recorder, etc., a vocal communication link comprising a student communicator 60, an instructor communicator 61 and a communications controller 62, a tape recorder 63 and an image projection device comprising a projector 64 associated with the display unit 4 and a large screen 65.

The main computer 56 reads and interprets all of the operator controls 18,19 and is programmed according to predetermined mathematical models the equations of which are applicable to the range of exercises which can be selected. These equations take into account at least the following input parameters:
 (1) Keel clearance
 (2) Open/closed berth configurations
 (3) Ship engine speed
 (4) Ship rudder angle
 (5) Wind direction and speed
 (6) Direction and speed of the sea currents
 (7) Bow thruster speed and direction
 (8) Mooring line loads and positions
 (9) Tug orientation and forces
 (10) Fender dynamics Thus, after reading and interpreting the controls, the computer evaluates and updates solutions to the equations used to define the ship and tug positioning, and it continuously updates the information to be presented on the VDUs. It can also write to and read from the bulk storage device 59, which is used to record and play back an exercise, and it outputs information to the line printer 37. The graphics controller 57 converts digital inputs from the computer 56 to analogue outputs capable of driving high resolution cathode ray tube displays in the display units 3 and 4.

Digital information from the computer 56 is stored in a memory which is then used to generate continuously vectors and characters to be displayed. A particular feature of the controller 57 is that it generates continuous shapes, i.e. solid lines are drawn as opposed to a series of dots, which makes close proximity viewing much more acceptable. However, alternative less-sophisticated controllers can be incorporated which give less effective presentations if the student requirement is to cover multi-function exercises at a lower cost. During initialisation and scale changing the computer 56 loads the controller 57 with vector information representative of the static components, such as the jetty J and the instrument scales. A 'playing area' of the screen is defined about which the dynamic components (ship S and tugs T) can be moved and approximately every tenth of a second the computer causes the controller 57 to blank the dynamic playing area and then overwrite with updated information, producing an impression of motion.

Figure 6:
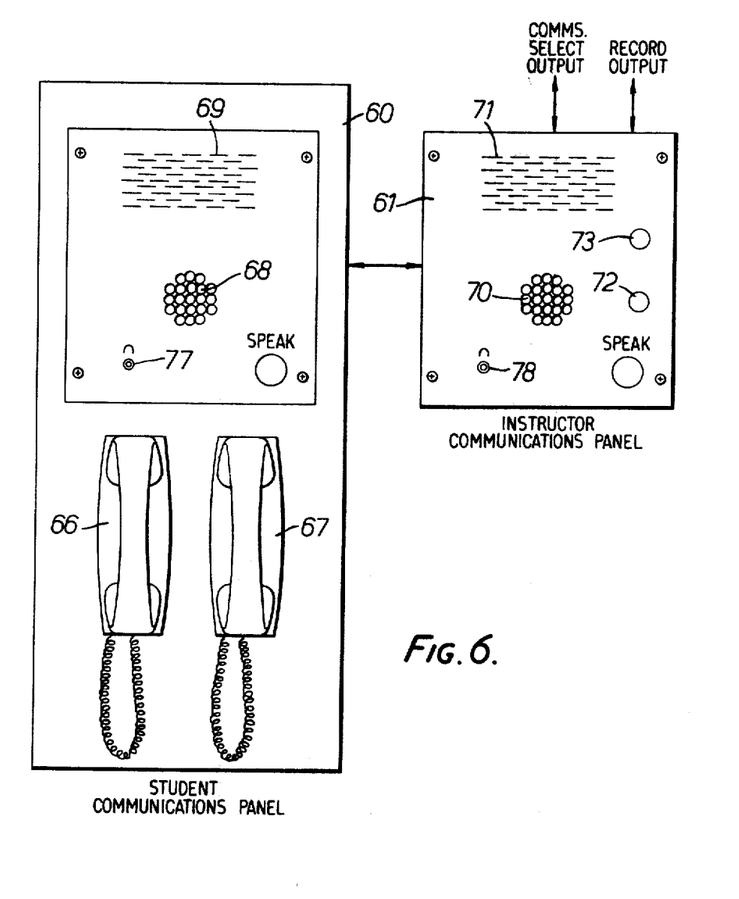
FIG. 6 illustrates vocal communication means of the consoles.

The student/instructor communication link as already mentioned includes the student communicator 60, the instructor communicator 61 and associated controller 62, the communicators being illustrated in detail in FIG. 6. Via this link the student is able to give vocal instructions in accordance with which the instructor can adjust the ship/tug controls, and the communicator 60 comprises handsets 66 and 67, a microphone 68 and a loudspeaker 69. The handsets respectively simulate an internal telephone and a VHF telephone, and the microphone and loudspeaker simulate the talkback system which is the other communication channel normally available to a pilot on the bridge of a ship, as has been described.

Only one communication device is required by the instructor and hence the handsets are not reproduced in the communicator 61, communication being entirely by way of a microphone 70 and loudspeaker 71. Indicator lamps 72 and 73 respectively indicate whether the student handsets are in use. The controller 62 detects which communication device is being used by the student and automatically connects it to the communicator 61 and, when appropriate, lights one of the lamps 72,73 to inform the instructor which simulated type of communication is in use. Provision is also made for the use of headsets (i.e. headphones and microphone combined) by the student and/or instructor. When a headset is connected to student jack socket 77 or instructor jack socket 78 the audio devices on the relevant communication panel are bypassed.

The bulk storage device 59 allows a recording of any exercise to be made and kept, thus allowing the exercise to be replayed and fully analysed at a later date. The instructor can also pre-record exemplary exercises for subsequent student instruction, and a recorded exercise can be replayed at a different speed to that at which it was recorded; it is also possible to replay up to a chosen point and then to continue under manual control. Data for an exercise is recorded at regular intervals by storing the current settings of all the independent variables, for example ship position and tug vectors, in the bulk storage device. The recorder 63 enables a simultaneous recording of the communication dialogue to be made, and this may be played back in synchronism with the display.

Figure 7:
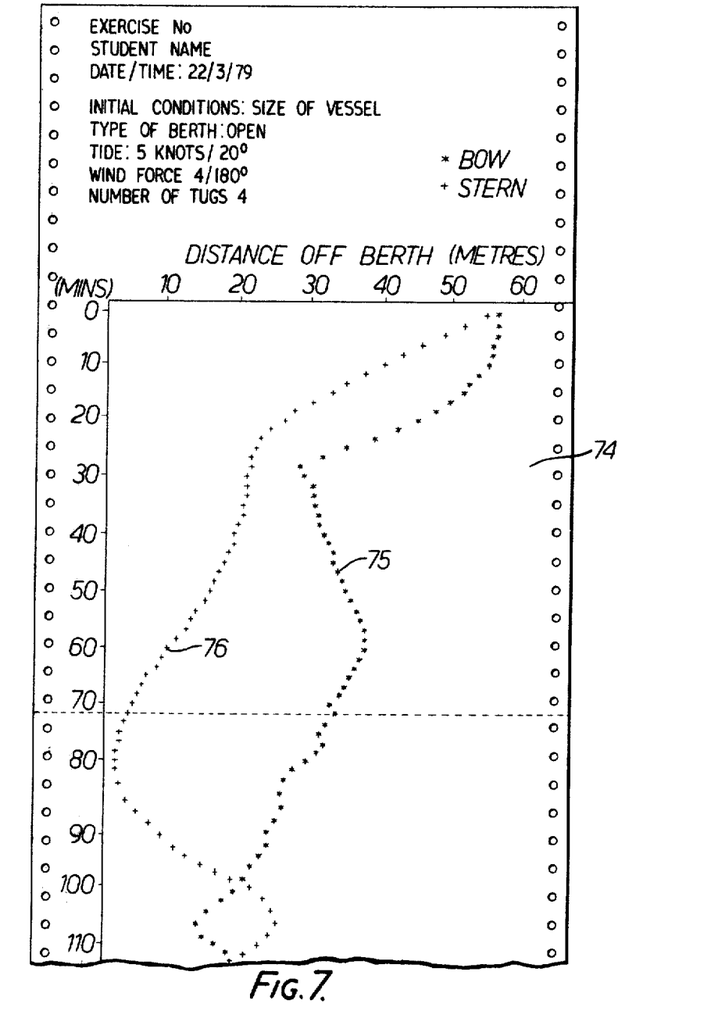
FIG. 7 illustrates a typical hard copy printout of a berthing exercise.

The line printer 37 is particularly valuable for producing visual records of berthing exercises, a typical initial section of such a recording being illustrated in FIG. 7. In this example, which is printed on a strip chart 74, the line 75 is a plot of bow distance-off against time and the line 76 is a similar plot of the stern distance-off, the chart axes being scaled in minutes and meters respectively. A line number display is provided so that, on playback of a recorded exercise, the visual record can be referenced to the graphics display. The copy also provides a record of student performance for subsequent evaluation and filing.

Figure 8:
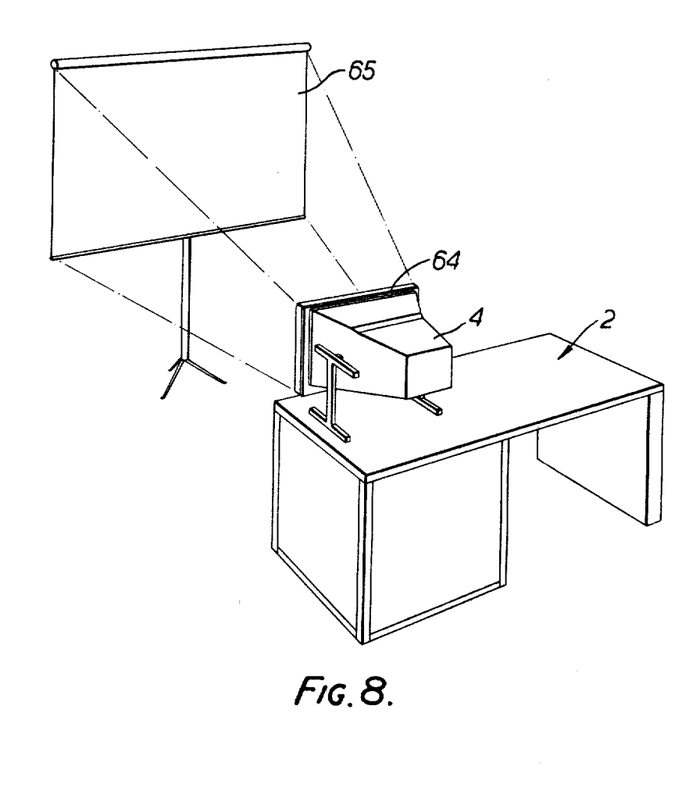
FIG. 8 illustrates an image projection device.

The image projection device mentioned briefly with reference to FIG. 3 is also an extremely valuable optional feature and it is shown in more detail in FIG. 8. The projector 64 can be mounted on either VDU 3 or 4, and projects the display on to the large free-standing screen 65. This provides a facility for group viewing and instruction and the projector works on the epidiascope principle. It can alternatively project on to any suitable white surface, and it is furthermore designed so that it is quickly attachable to or removable from the VDUs.

The described embodiment has three main operational modes and the equipment is primarily designed for use by two people in a "student/instructor mode". The design is such that the student requires a minimal amount of instruction before an exercise, typically a berthing exercise, can commence and the use of a vocal communication link with no controls accessible to the student accurately simulates the real life situation in which a berthing is accomplished by a pilot. Normally the instructor will set the environmental and display conditions prior to the commencement of an exercise and then merely adjust the ship/tug controls as directed by the student. However, if required the environmental and display parameters can be changed during the course of an exercise.

The layout of the instructor console 1, with the controls separated into two groups 18 and 19, facilitates use of the equipment in a "self-teach mode" in which the student uses the console 1. When the console 1 is employed for self-teaching the environmental and display conditions can be initially set so that the student merely has to manipulate the minimum number of controls provided by group 19 during a berthing exercise.

In a "debriefing class instruction mode" the system is configured for class instruction using the image projection system illustrated in FIG. 8 thereby facilitating group viewing. This large screen display can be used for debriefing when a student's attempt at an exercise can be replayed and discussed by the class, or for instruction when it enables the instructor to teach a large number of students simultaneously.

The system is designed so that in addition to setting a predetermined exercise utilising the mathematical models by which the computer 56 is programmed the instructor can bypass those models and use the system to demonstrate common ship manoeuvres of his own devising and under his own control. The play area can also be expanded to include open-sea handling manoeuvres, and the design provides for the addition of water tractor dynamics and the facility for defined jetty/fender/shore contours to be introduced, the latter enabling the dynamic response of various jetty/fender designs to be ascertained and checked.

The system is further designed so that it can accept user-defined programmes. User programs contained in the bulk storage device can be loaded into the computer memory and then run in the normal way. A keyboard may also be fitted to enable the user to input programme code or enter parameters into the computer.

Other embodiments of the invention utilising the same or equivalent principles may be used and structural changes may be made as desired by those skilled in the art without departing from the present invention and the purview of the appended claims.

We claim:

1. A ship navigation and handling training simulator comprising a first console for use by a student trainee and a second console for use by an instructor, at least one of said consoles having a screen to provide a mimic display of the ship and environmental information, two groups of controls for setting-in respectively the environmental and display information applicable to a navigational or handling exercise to be performed and information representing ship/tug control decisions by the student trainee, said second console being associated at least with the said group of controls for setting-in environmental and display information, and computer means programmed to control the display on a time scale in accordance with the information set-in on both said groups of controls and changes thereto during the course of the exercise.

2. A ship navigation and handling training simulator according to claim 1, wherein each of said consoles has a screen and both console screens provide an identical display at least of the navigational data.

3. A ship navigation and handling training simulator according to claim 3, wherein the display of certain instrument readings and computer generated messages is optionally restricted to the display at said second console.

4. A ship navigation and handling training simulator according to claim 1, wherein both said groups of controls are associated with said second console so that no manually-operated controls are accessible to the student trainee, and both consoles are interconnected by a voice link so that the instructor can initially set the environmental and display controls and subsequently adjust the group of controls for ship/tug control in accordance with vocal instructions from the student trainee.

5. A ship navigation and handling training simulator according to claim 4, wherein three vocal communication devices are provided for selective use by the student trainee and respectively simulate an internal telephone (to main control positions), a VHF telephone (to tug and berthing masters) and a talkback system (to the bridge of the ship).

6. A ship navigation and handling training simulator according to claim 5, wherein only one communication device is provided at said second console for use by the instructor for communication with the student trainee at said first console, the equipment used detecting and indicating which of said three communication devices is in use by the student trainee and automatically connecting it to the single communication device used by the instructor.

7. A ship navigation and handling training simulator according to claim 1, wherein the tug controls of the corresponding said group of controls are provided on separate modules, so that other student trainees can remove such modules and individually assume the roles of tugs masters each of whom is in vocal communication with said first console.

8. A ship navigation and handling training simulator according to claim 1, wherein controls are provided operative to select the scale at which the exercise is presented in the display thereof.

9. A ship navigation and handling training simulator according to claim 1, wherein a cursor device is adjustable relative to the display screen for positioning of the display on the screen and at the relevant time during berthing definition the computer is operative to control the position of the centre of the ship on the screen so that it coincides with the cursor, thus allowing any initial ship position to be selected relative to the remainder of the display.

10. A ship navigation and handling training simulator according to claim 1, wherein recording means enable an exercise to be recorded for subsequent replay, and the time scale is selectively variable in respect of both an exercise and the replay thereof.

11. A ship navigation and handling training simulator according to claim 1, wherein said group of controls relating to ship/tug control has the controls thereof arranged in three sections respectively relating to ship control, tug control and mooring rope position.

12. A ship navigation and handling training simulator according to claim 1, wherein artificial time lags are introduced, in order to give a more realistic response whenever any change is made to the ship controls and in respect of changes in the tug controls, other than a Rope On/Rope Off control simulating rope failure.

* * * * *